United States Patent
Keyser et al.

(10) Patent No.: US 8,666,529 B2
(45) Date of Patent: Mar. 4, 2014

(54) CONTROLLING NON-PROCESS OF RECORD (POR) PROCESS LIMITING YIELD (PLY) INSPECTION WORK

(75) Inventors: Rebekah M. Keyser, Poughkeepsie, NY (US); John A. Rudy, Port Chester, NY (US); Brian J. Wazewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 12/869,973

(22) Filed: Aug. 27, 2010

(65) Prior Publication Data
US 2012/0053722 A1 Mar. 1, 2012

(51) Int. Cl.
*G06F 19/00* (2011.01)
(52) U.S. Cl.
USPC .............................. 700/95; 702/117
(58) Field of Classification Search
CPC ....................................... G06F 19/00
USPC ............ 700/95–100, 105, 109, 121; 702/117; 257/E21.528; 438/14, 18, 50
See application file for complete search history.

(56) References Cited

U.S. PATENT DOCUMENTS

| 5,444,637 A * | 8/1995 | Smesny et al. ................. 702/127 |
|---|---|---|
| 5,826,040 A * | 10/1998 | Fargher et al. ................ 705/7.24 |
| 5,838,565 A | 11/1998 | Hsieh et al. |
| 6,263,253 B1 * | 7/2001 | Yang et al. ....................... 700/99 |
| 6,410,927 B1 * | 6/2002 | Pike ............................ 250/491.1 |
| 6,564,113 B1 | 5/2003 | Barto et al. |
| 6,594,536 B1 | 7/2003 | Lin et al. |
| 6,731,999 B1 * | 5/2004 | Yang et al. ..................... 700/102 |
| 6,732,006 B2 * | 5/2004 | Haanstra et al. .............. 700/121 |
| 6,748,287 B1 * | 6/2004 | Hagen et al. ..................... 700/99 |
| 6,826,298 B1 * | 11/2004 | O'Dell et al. ................. 382/149 |
| 6,937,753 B1 * | 8/2005 | O'Dell et al. ................. 382/141 |
| 6,985,788 B2 * | 1/2006 | Haanstra et al. .............. 700/121 |
| 7,029,930 B2 * | 4/2006 | Tomer et al. ..................... 438/14 |
| 7,179,664 B2 * | 2/2007 | Huang et al. ..................... 438/14 |
| 7,236,843 B1 * | 6/2007 | Wizelman et al. ............ 700/100 |
| 7,369,914 B2 | 5/2008 | Webb |
| 7,539,553 B2 * | 5/2009 | Chang et al. .................. 700/121 |
| 7,647,130 B2 | 1/2010 | Fischer et al. |
| 7,832,353 B2 * | 11/2010 | Takizawa et al. ............. 118/712 |
| 2005/0250226 A1 * | 11/2005 | Huang et al. ..................... 438/14 |

* cited by examiner

*Primary Examiner* — Kidest Bahta
(74) *Attorney, Agent, or Firm* — Cantor Colburn LLP; Ian MacKinnon

(57) ABSTRACT

A method of controlling a quantity of non-process of record (POR) process limiting yield (PLY) inspections in wafer processing includes setting aside planned capacity for non-POR work, upon receipt of a request for non-POR work, estimating a time required for completion of the request and comparing the estimated time against a remainder of the set aside planned capacity, approving the request in an event the comparison indicates that the estimated time is available in the set aside planned capacity and rejecting the request in an event the comparison indicates that the estimated time is not available in the set aside planned capacity.

24 Claims, 4 Drawing Sheets

CONTROLLING NON-PROCESS OF RECORD (POR) PROCESS LIMITING YIELD (PLY) INSPECTION WORK

BACKGROUND

Aspects of the present invention are directed to a method of controlling non-process of record (POR) process limiting yield (PLY) inspection work.

In wafer processing technologies, a set of wafers on which integrated circuits are to be imprinted are built in accordance with scheduled wafer starts, which establishes a number of wafers that are to be built. In this regime, a number of those wafers will need to be inspected for defects and/or other abnormalities to identify issues that may negatively impact the total wafer yield and the economic benefit of the wafer set. Typically, the number of the wafers to be inspected is established by process limiting yield (PLY) capacity planning.

Scheduled wafer starts are wafers that are started or built for the purpose of being inspected and is referred to as process of record (POR) work for inspection tools. Additional loading on the inspection tools is engineering work referred to as non-POR and has no associated wafer start schedule. That is, such work lies outside of the PLY planning capacity.

Capacity planning is indeed often unable to account for this additional loading since such planning may, in fact, not be possible due to the possibility of inspection schedules changing dynamically and event driven work. For example, with respect to a given wafer start schedule, an issue may arise that relates to an unknown issue in existence at the time of the capacity planning and may require inspection tool access that could not have been anticipated, planned for or scheduled. Unfortunately, current systems have little or no ability to track current dynamic available capacity and often only limit POR work sent to PLY inspection tools causing all of the work to build up at the tool in an unconstrained manner. Thus, since work at the PLY tools can build up in the unconstrained manner, the backlog may cause high Xfactor issues, inspection delays that can cause tool inhibits and missed/delayed critical inspection data.

SUMMARY

In accordance with an aspect of the invention, a method of controlling a quantity of non-process of record (POR) process limiting yield (PLY) inspections in wafer processing is provided and includes setting aside planned capacity for non-POR work, upon receipt of a request for non-POR work, estimating a time required for completion of the request and comparing the estimated time against a remainder of the set aside planned capacity, approving the request in an event the comparison indicates that the estimated time is available in the set aside planned capacity and rejecting the request in an event the comparison indicates that the estimated time is not available in the set aside planned capacity.

In accordance with an aspect of the invention, a storage medium is provided and has executable instructions stored thereon, which, when executed, cause a processing unit of a computing device to execute method of controlling a quantity of non-process of record (POR) process limiting yield (PLY) inspections in wafer processing, the method including establishing a PLY capacity database in which information relating to POR and non-POR work is stored, the information including work group definitions, sub-group definitions, sample group size information, details of previous POR and non-POR requests and completion times for previous POR and non-POR requests, setting aside planned capacity for non-POR work, the set aside planned capacity including at least one of a time component and a sample size component, upon receipt of a request for non-POR work, estimating a time required for completion of the request and comparing the estimated time against a remainder of the set aside planned capacity, approving the request in an event the comparison indicates that the estimated time is available in the set aside planned capacity and rejecting the request in an event the comparison indicates that the estimated time is not available in the set aside planned capacity.

In accordance with an aspect of the invention, a system to control a quantity of non-process of record (POR) process limiting yield (PLY) inspections in wafer processing is provided and includes a plurality of wafers, a first system component to designate for POR work a predefined number of the plurality of the wafers, a second system component to set aside planned capacity for non-POR work, to designate for non-POR work a number of remaining ones of the plurality of the wafers in accordance with a non-POR work request and a determination that completion of the request is possible given a remainder of the set aside planned capacity for non-POR work subject to an override command issued by an authorized individual and a plurality of tools for executing the POR and non-POR work.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

In accordance with aspects of the present invention, a method of controlling non-process of record (POR) process limiting yield (PLY) inspections is provided. The method includes setting aside planned capacity for engineering work requests (EWRs) in an inspection tool model, such as an equipment planning tool work sheet (TWS), and then informing a controlling PLY capacity database of allocated hours that are available. The PLY capacity database is provided with set clip levels and keeps a running record of approved engineering work requests (EWRs) and their capacity allotment so that requestors can access the system and apply to have new EWR inspections. The database checks capacity available at the time and approves or denies new EWRs based on a comparison of new inspection requirements versus the available tool time to run. This occurs in real time and is updated dynamically as EWRs are added and removed.

Thus, aspects of the present invention provide for a work in progress (WIP) management method that dynamically controls an amount of non-POR work that can be inspected based on actual capacity. A new inspection request may be compared against reserved capacity and, if this capacity is available, the request will be approved. A system executing the method may then be updated to record an additional capacity demand. If there is no reserved capacity, the system will reject the request and notify the requestor subject to an override command. As such, once limits are set in the PLY capacity database, no manual intervention is needed and the system self limits to available capacity. Moreover, the system prevents incoming WIP from arriving and largely eliminates the need for reactionary tactics, such as bypassing WIP and managing operating level inspections.

Figure 1:
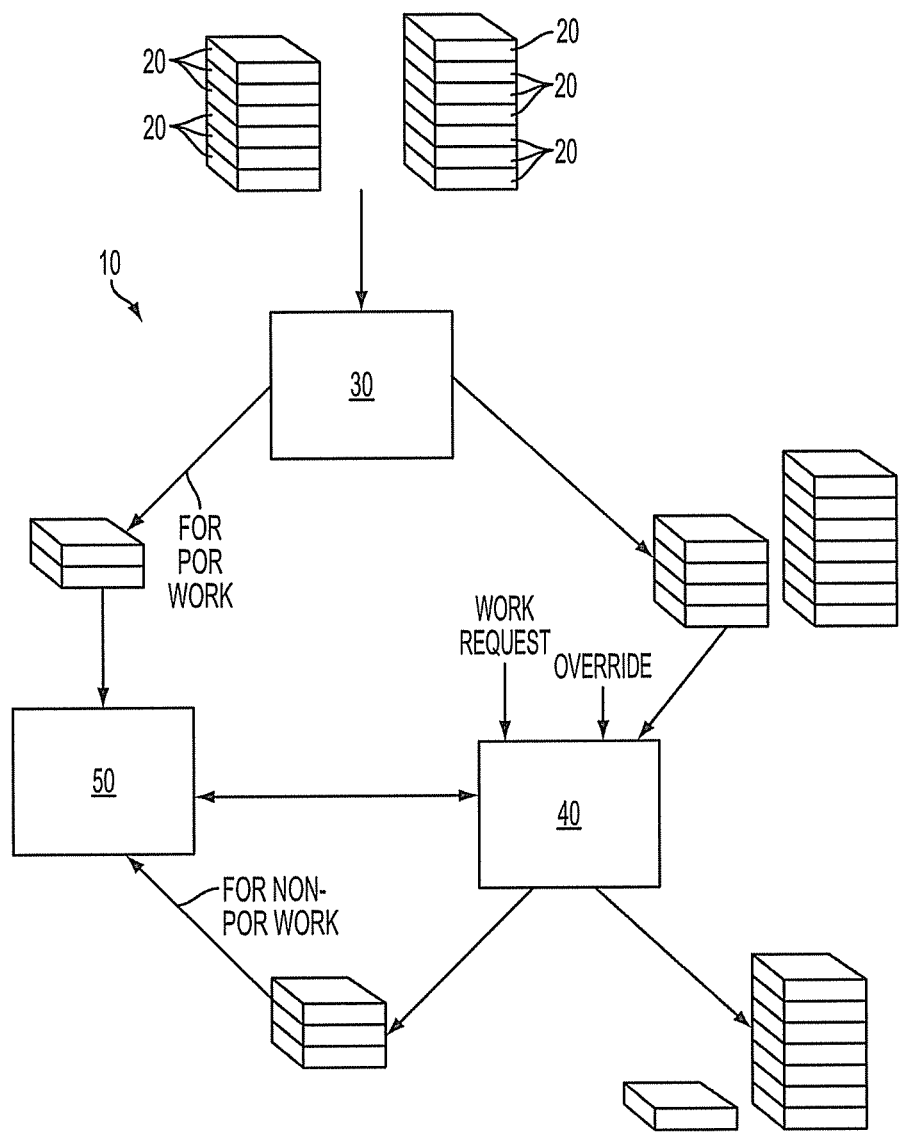
FIG. 1 is a schematic diagram of a system to control a quantity of non-process of record (POR) process limiting yield (PLY) inspections in wafer processing.

With reference to FIG. 1, a system 10 to control a quantity of non-process of record (POR) process limiting yield (PLY) inspections in wafer processing is provided. As shown, the system 10 includes a plurality of wafers 20, which are illustrated as individual wafers or, more generally, as lots of wafers whereby each lot contains a plurality of individual wafers, a first system component 30, a second system component 40 and a plurality of tools 50. The first system component 30 is configured to designate for POR work a predefined number of the plurality of the wafers 20. The second system component 40 is configured to set aside planned capacity for non-POR work, to designate for non-POR work a number of remaining ones of the plurality of the wafers 20 in accordance with a non-POR work request and a determination that completion of the request is possible given an available remainder of the set aside planned capacity for non-POR work subject to an override command issued by an authorized individual. The plurality of tools 50 may include for example optical wafer inspection tools and serve to execute the POR and non-POR work. As will be described below, the second system component 40 is disposed in signal communication with the plurality of the tools 50 to track and monitor execution details and times of the POR and the non-POR work.

Figure 2:
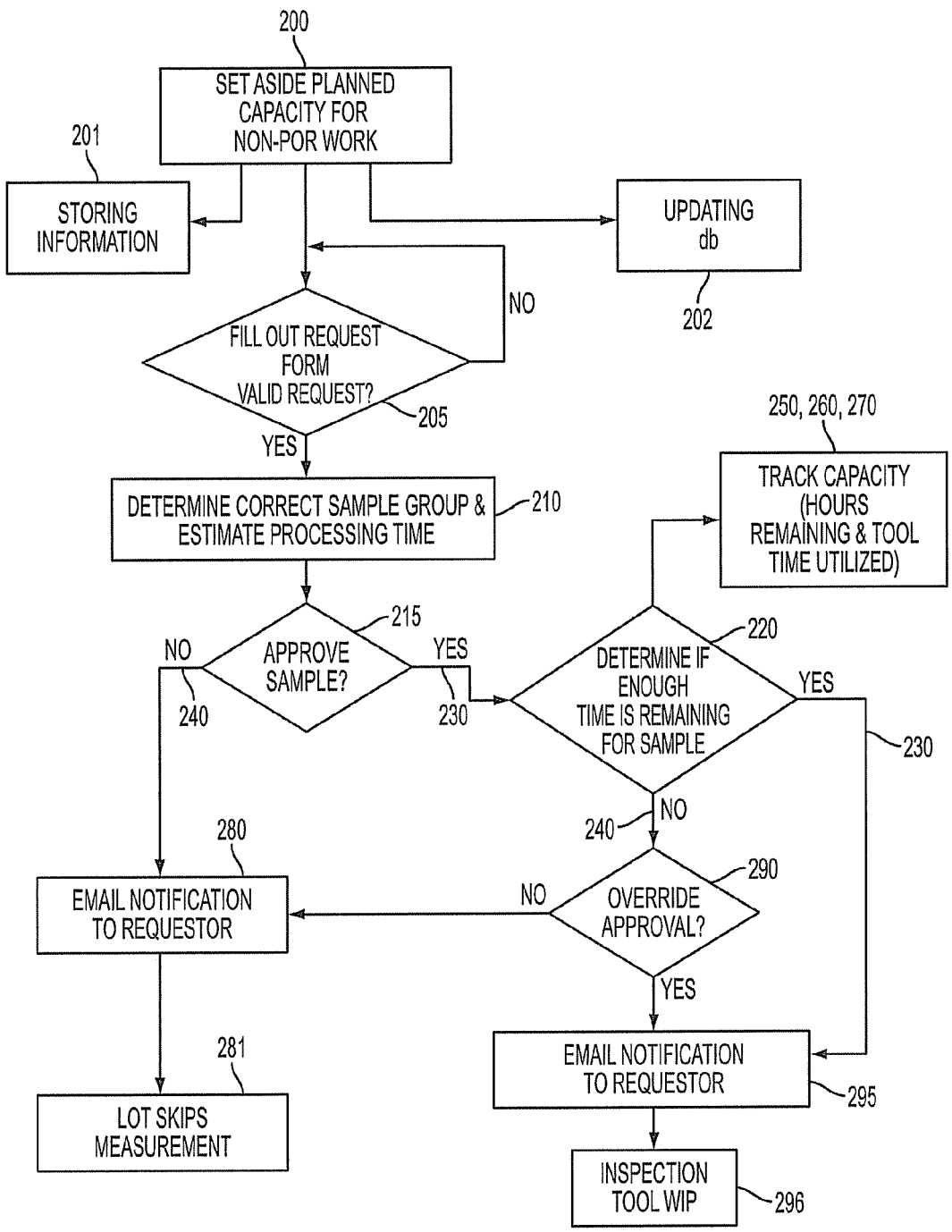
FIG. 2 is a flow diagram illustrating a method of controlling a quantity of non-process of record (POR) process limiting yield (PLY) inspections in wafer processing.

With reference to FIG. 2, a method for use with the system 10 described above is provided to control a quantity of non-process of record (POR) process limiting yield (PLY) inspections in wafer processing. The method includes setting aside planned capacity for non-POR work (200) and, upon receipt of a valid request for non-POR work (205), determining a correct sample group and estimating a time required for completion of the request (210). An invalid request may automatically be rejected.

If the determined sample group is rejected at approve sample operation 215, control reverts to operation 280 and, if the determined sample group is approved at approved at sample operation 215, the determined sample group size and/or the estimated time is compared against a remainder of the set aside planned capacity (220). In an event the comparison indicates that the sample group size and/or the estimated time is available in the set aside planned capacity, the method further includes approving the request (230) and, in an event the comparison indicates that the sample group size and/or the estimated time is not available in the set aside planned capacity, the method further includes rejecting the request (240).

The method of FIG. 2 further includes tracking consumption of the set aside planned capacity (250) and calculating a result of the tracking as the remainder of the set aside planned capacity (260). That is, if the set aside planned capacity is, for example, 1 hour and other non-POR PLY inspections consume 0.5 hours, the remainder of the set aside planned capacity is calculated to be 0.5 hours. As such, if the estimated time required for completion of the request is 0.25 hours, the request will be approved in accordance with operation 230 whereas, if the estimated time required for completion of the request is 0.75 hours, the request will be rejected in accordance with operation 240.

The method of FIG. 2 still further includes tracking inspection tool time utilized (270). In this way, information obtained from the tracking can be used to inform the tracking of the consumption of the set aside planned capacity in operation 250 and the estimating of the time required for the completion of the request of operation 210. For example, if only one tool is available for non-POR PLY inspections, the information obtained from the tracking of previous inspections can be used to estimate how long future similar inspections will take on the tool.

If a determined sample is not approved or if a request is rejected due to insufficient remaining capacity, the method further includes notifying the requestor of the rejection (280) such that the lot that would have been associated with the request skips the measurement associated with the request (281). On the other hand, the rejection may be overridden (290) by an individual having override authority assigned to him/her issuing an override command. As such, an emergency non-POR PLY inspection, for example, which would otherwise be rejected can still be approved and performed. If the requestor's request is approved or if a rejected request is overridden, the method further includes notifying the requestor of the approval or the override (295) and placing the non-POR work of an approved request into a work in progress (WIP) queue of an inspection tool (296).

The set aside planned capacity may include at least one of a time component and a sample size component. That is, the set aside planned capacity may indicate that 1 hour is available for non-POR PLY inspections and that 2 lots of wafers out of many total lots will be available for such non-POR PLY inspections. Achieving the setting aside of the planned capacity in this or another form includes establishing a PLY capacity database 300 (see FIG. 3) in which information relating to both POR and non-POR work is stored (201) and, where necessary, updating the PLY capacity database 300 following completion of POR and non-POR work (202). The information stored in the PLY capacity database 300 may include, for example, work group definitions, sub-group definitions, sample group size information, details of previous POR and non-POR requests and completion times for previous POR and non-POR requests.

Figure 3:
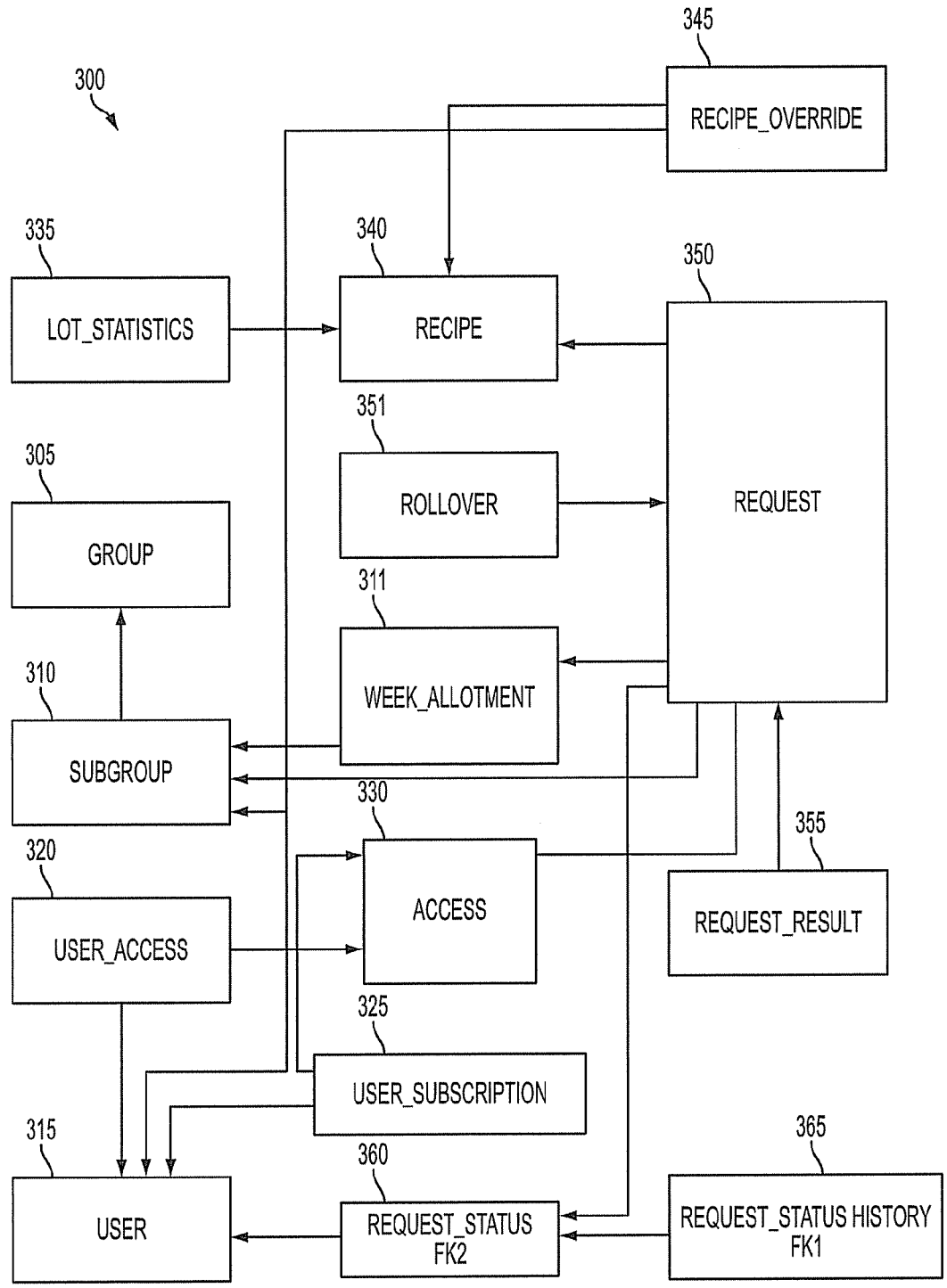
FIG. 3 is a flow diagram illustrating an exemplary PLY capacity database.

With reference to FIG. 3, a schematic diagram of an example of the PLY capacity database 300 according to embodiments is provided. As shown in FIG. 3, the PLY capacity database 300 includes group information 305, subgroup information 310 and week allotment information 311. The group information 305 relates to relatively large groups of people working toward a common wafer processing goal while the subgroup information 310 relates to smaller units of those relatively large groups, such as teams in which specific actions are taken. The group information 305 may therefore include tool types useful to the group as a whole, work areas used by the group and POR and non-POR PLY hours generally allotted to the group while the subgroup information 310 may include a type of each subgroup, which describes the type of work each team does, a group key and a portion of the POR and non-POR PLY hours generally allotted to the group, which are divided between the teams. The week allotment information 311 includes associated year, week, subgroup key and hour allotment information for each subgroup identified in the subgroup information 310.

The PLY capacity database further includes user information 315, user access information 320 governing access rights for each of the users described by the user information 315, user subscription information 325 and access information 330. The user subscription information 325 associates each of the users with each of the groups and each of the subgroups described by the group information 305 and the subgroup information 310, respectively. The access information 325 may include an access key associated with names and descriptions of groups, subgroups and users having various access rights.

Still referring to FIG. 3, lot statistics 335, recipe information 340 and recipe override information 345 are provided. The lot statistics 335 include inspection wafer counts, processing hours required for each lot and PLY recipes, which are names and descriptions of various types of POR and non-POR inspections for each lot. The recipe information 340 includes information relating to various PLY recipes provided in the lot statistics 335. The recipe override information 345 includes changes to the PLY recipes of the recipe information 340.

The recipe information 340 is informed by request information 350, which is in turn informed by rollover information 351 and request result information 355. Request information 350 includes lot identification information, PLY recipes, descriptions of request types, processing hours for various request types and lots and inspection wafer count information. The rollover information 351 includes identifications and counts of rolled over requests along with a limit value limiting the amount of rollover requests that is possible. The request information 350 along with request status history information 365 further informs request status history 360, which includes status information for current requests and notification information that can be relied upon to notify users of results of their requests that are either approved or rejected.

Referring back to FIG. 2, the determining of the correct sample group and the estimating of the time required for completion of the request of operation 210 may be achieved in a number of ways. For example, the estimating may include reading and analyzing the information stored in the PLY capacity database 300 and, based on that analysis, determining whether the requested non-POR work has been executed previously and establishing the estimated time in accordance with a completion time of the previously executed non-POR work or determining whether the requested non-POR work is similar to previously requested POR or non-POR work and establishing the estimated time in accordance with a completion time of an execution of the previously requested POR or non-POR work.

Figure 4:
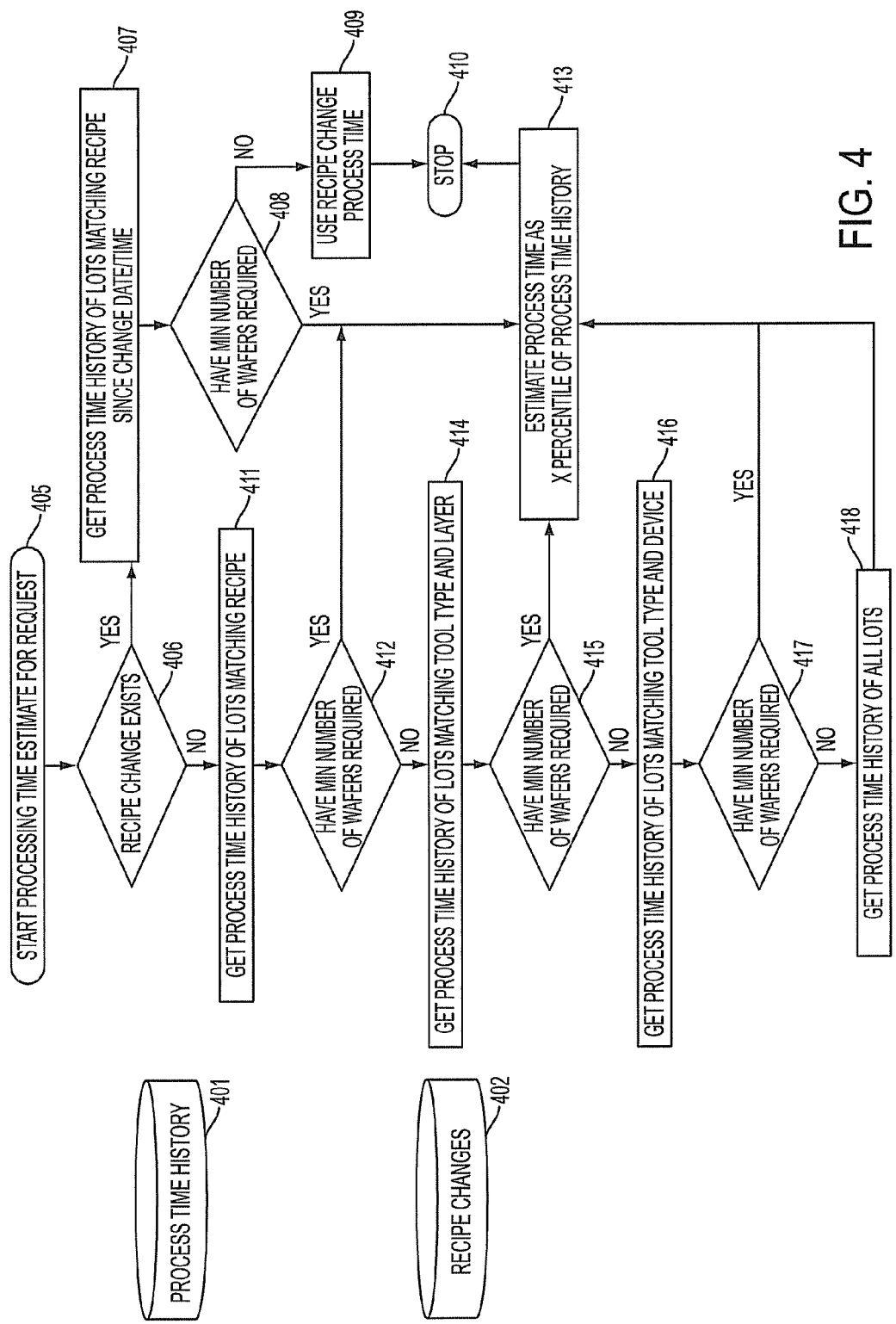
FIG. 4 is a process time estimate flow chart.

With reference to FIG. 4 and, in an exemplary embodiment, it is to be understood that the PLY capacity database 300 of FIG. 3 may further include process time history repository 401 and recipe change repository 402. The process time history repository 401 can be populated by periodically running an application that stores processing times for the most recent POR and non-POR PLY inspections for each recipe. The recipe change repository 402 allows recipe creators to store processing times and the date/time when a recipe was changed.

As shown in FIG. 4, with the process time history repository 401 and recipe change repository 402 provided, a processing time estimate can be started upon receipt of a valid request (405). At this point, it is determined whether a recipe change exists (406) by reference to for example the recipe change repository 402. If a recipe change exists, process time history information of lots matching the recipe since the date/time of the change is obtained (407) by reference to the process time history repository 401 and it is determined whether a minimum number of wafers required for the request is available (408). If the minimum number of wafers is not available, the recipe change process time is used and the estimating stops.

If no recipe change exists, the process time history information of lots matching the recipe is obtained (411) by reference to the process time history repository 401 and it is again determined whether a minimum number of wafers required for the request is available (415). If the minimum number of wafers is available, the estimating is achieved by estimating the process time as an x percentile of the process time history (413). If the minimum number of wafers is not available, the process time history information of lots matching the tool type and device for the request is obtained (416) from the process time history repository 401, and it is again determined whether a minimum number of wafers required for the request is available (417). If the minimum number of wafers is available, the estimating is achieved by estimating the process time as an x percentile of the process time history (413) and, if the minimum number of wafers is not available, the process time history of all lots is obtained from the process time history repository 401 and the estimating is achieved by estimating the process time as an x percentile of the process time history (413).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of controlling a quantity of non-process of record (POR) process limiting yield (PLY) inspections in wafer processing, the method comprising:
    in an event that POR work is scheduled as wafer starts for inspection by inspection tools, setting aside planned capacity of the inspection tools for non-POR work characterized as having no wafer start schedule;
    upon receipt of a request for non-POR work, estimating a time required for completion of the request and comparing the estimated time against a remainder of the set aside planned capacity;
    approving the request in an event the comparison indicates that the estimated time is available in the set aside planned capacity; and
    rejecting the request in an event the comparison indicates that the estimated time is not available in the set aside planned capacity.

2. The method according to claim 1, further comprising:
    tracking consumption of the set aside planned capacity; and
    calculating a result of the tracking as the remainder of the set aside planned capacity.

3. The method according to claim 1, further comprising tracking inspection tool time utilized.

4. The method according to claim 1, wherein the set aside planned capacity comprises at least one of a time component and a sample size component.

5. The method according to claim 1, further comprising establishing a PLY capacity database in which information relating to POR and non-POR work is stored.

6. The method according to claim 5, wherein the information comprises work group definitions, sub-group definitions, sample group size information, details of previous POR and non-POR requests and completion times for previous POR and non-POR requests.

7. The method according to claim 5, further comprising updating the PLY capacity database following completion of POR and non-POR work.

8. The method according to claim 5, wherein the estimating comprises analyzing the information stored in the PLY capacity database.

9. The method according to claim 5, wherein the estimating comprises:
determining whether the requested non-POR work has been executed previously; and
establishing the estimated time in accordance with a completion time of the previously executed non-POR work.

10. The method according to claim 5, wherein the estimating comprises:
determining whether the requested non-POR work is similar to previously requested POR or non-POR work; and
establishing the estimated time in accordance with a completion time of an execution of the previously requested POR or non-POR work.

11. The method according to claim 5, further comprising:
determining a sample group sample size along with the estimating; and
comparing the estimated time and the determined group sample size against a remainder of the set aside planned capacity.

12. The method according to claim 1, wherein the rejecting further comprises notifying a requestor of a rejection or an approval of a request thereof.

13. The method according to claim 1, further comprising:
assigning override authority to predefined individuals;
overriding a rejection of a request upon receipt of an override command issued by at least one or more of the predefined individuals; and
notifying a requestor of an override of the rejection.

14. The method according to claim 1, further comprising placing the non-POR work of an approved request into a work in progress (WIP) queue of an inspection tool.

15. A storage medium having executable instructions stored thereon, which, when executed, cause a processing unit of a computing device to execute method of controlling a quantity of non-process of record (POR) process limiting yield (PLY) inspections in wafer processing, the method comprising:
establishing a PLY capacity database in which information relating to POR and non-POR work is stored, the information including work group definitions, sub-group definitions, sample group size information, details of previous POR and non-POR requests and completion times for previous POR and non-POR requests;
in an event that POR work is scheduled as wafer starts for inspection by inspection tools, setting aside planned capacity of the inspection tools for non-POR work characterized as having no wafer start schedule, the set aside planned capacity including at least one of a time component and a sample size component;
upon receipt of a request for non-POR work, estimating a time required for completion of the request and comparing the estimated time against a remainder of the set aside planned capacity;
approving the request in an event the comparison indicates that the estimated time is available in the set aside planned capacity; and
rejecting the request in an event the comparison indicates that the estimated time is not available in the set aside planned capacity.

16. The method according to claim 15, further comprising:
tracking consumption of the set aside planned capacity and inspection tool time utilized; and
calculating a result of the tracking as the remainder of the set aside planned capacity.

17. The method according to claim 15, further comprising updating the PLY capacity database following completion of POR and non-POR work.

18. The method according to claim 15, wherein the estimating comprises analyzing the information stored in the PLY capacity database, the estimating comprising:
determining whether the requested non-POR work has been executed previously; and
establishing the estimated time in accordance with a completion time of the previously executed non-POR work.

19. The method according to claim 15, wherein the estimating comprises analyzing the information stored in the PLY capacity database, the estimating comprising:
determining whether the requested non-POR work is similar to previously requested POR or non-POR work; and
establishing the estimated time in accordance with a completion time of an execution of the previously requested POR or non-POR work.

20. The method according to claim 15, further comprising:
determining a sample group sample size along with the estimating; and
comparing the estimated time and the determined group sample size against a remainder of the set aside planned capacity.

21. The method according to claim 15, wherein the rejecting further comprises notifying a requestor of a rejection or an approval of a request thereof.

22. The method according to claim 15, further comprising:
assigning override authority to predefined individuals;
overriding a rejection of a request upon receipt of an override command issued by at least one or more of the predefined individuals; and
notifying a requestor of an override of the rejection.

23. The method according to claim 15, further comprising placing the non-POR work of an approved request into a work in progress (WIP) queue of an inspection tool.

24. A system to control a quantity of non-process of record (POR) process limiting yield (PLY) inspections in wafer processing, the system comprising:
a plurality of wafers;
a plurality of tools for executing POR and non-POR work, the POR work being scheduled as wafer starts for inspection by inspection tools and the non-POR work being characterized as having no wafer start schedule;
a first system component to designate for the POR work a predefined number of the plurality of the wafers;
a second system component to set aside planned capacity for the non-POR work, to designate for non-POR work a number of remaining ones of the plurality of the wafers in accordance with a non-POR work request and a determination that completion of the request is possible given a remainder of the set aside planned capacity for non-POR work subject to an override command issued by an authorized individual.

* * * * *